United States Patent
Toshima

(10) Patent No.: US 7,257,567 B2
(45) Date of Patent: Aug. 14, 2007

(54) DOCUMENT RETRIEVING METHOD AND APPARATUS

(75) Inventor: Eiichiro Toshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 10/831,150

(22) Filed: Apr. 26, 2004

(65) Prior Publication Data

US 2004/0243601 A1 Dec. 2, 2004

(30) Foreign Application Priority Data

Apr. 30, 2003 (JP) .............................. 2003-125812

(51) Int. Cl.
*G06F 7/00* (2006.01)
*G06F 17/30* (2006.01)
(52) U.S. Cl. .............................. 707/1; 707/6
(58) Field of Classification Search .................... 707/1, 707/3–10, 100; 715/513, 517, 520, 500; 382/305; 358/403
See application file for complete search history.

(56) References Cited

U.S. PATENT DOCUMENTS

| | | | | |
|---|---|---|---|---|
| 5,999,664 | A * | 12/1999 | Mahoney et al. | 382/305 |
| 6,128,102 | A * | 10/2000 | Ota | 358/403 |
| 6,400,853 | B1 | 6/2002 | Shiiyama | 382/305 |
| 6,562,077 | B2 * | 5/2003 | Bobrow et al. | 715/517 |
| 6,895,552 | B1 * | 5/2005 | Balabanovic et al. | 715/513 |
| 2002/0052872 | A1 * | 5/2002 | Yada | 707/6 |
| 2003/0101177 | A1 * | 5/2003 | Matsubayashi et al. | 707/6 |

FOREIGN PATENT DOCUMENTS

| | | |
|---|---|---|
| JP | 08-263512 | 10/1996 |
| JP | 10-260983 | 9/1998 |

OTHER PUBLICATIONS

Xing Qiang and Yuan Baozong (2002), A New Framework of CBIR Based on KDD, pp. 973-976.*
Rong Zhao and William I. Grosky (2002), Narrowing the Semantic Gap-Improved Text-Based Web Document Retrieval Using Visual Features, pp. 189-200.*
Weihua Huang, Chew Lim Tan, Sam Yuan Sung and Yi Xu (2001), Vertical Bar Detection for Guaging Text Similarity of Document Images, pp. 640-644.*

* cited by examiner

*Primary Examiner*—Don Wong
*Assistant Examiner*—Merilyn Nguyen
(74) *Attorney, Agent, or Firm*—Fitzpatrick, Cella, Harper & Scinto

(57) ABSTRACT

In the proposed document retrieving apparatus, text feature data that bases upon text data included in a document and image feature data that bases upon a document image are stored in a memory. Image data of a search document is subjected to character recognition processing, text feature data is acquired based on the obtained text data, and image feature data (layout data) is acquired based on the image data of the search document. Using the text feature data and image feature data acquired with respect to the search document, a memory is searched, and a document corresponding to the search document is retrieved from plural documents.

20 Claims, 9 Drawing Sheets

FIG. 2
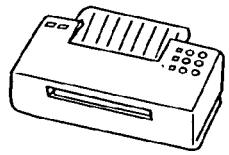
BJ F900は、最高の写真画質を追求したBJシリーズのフラッグシップモデル。従来のモデルのBJ F870と比べて2倍の3.072本というノズル数を持つ新開発の超多ノズルヘッドの採用をはじめ、駆動周波数の向上や給排紙機構の改良により、A4サイズの超写真画質プリントを、クラス最高速の約1分という高速スピードで出力可能です。
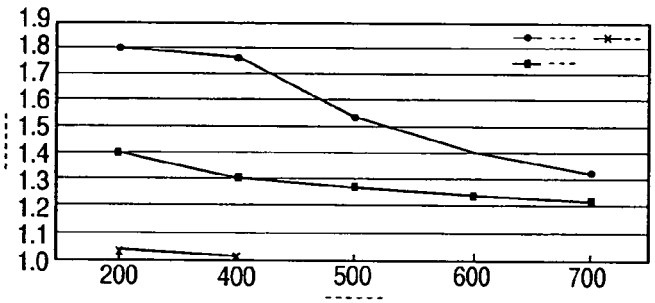
— 201
⬇
— 211
BJ F900は、最高の写真画質を追求したBJシリーズのフラッグシップモデル。従来のモデルのBJ F870と比べて2倍の3.072本というノズル数を持つ新開発の超多ノズルヘッドの採用をはじめ、駆動周波数の向上や給排紙機構の改良により、A4サイズの超写真画質プリントを、クラス最高速の約1分という高速スピードで出力可能です。
— 212
— 202
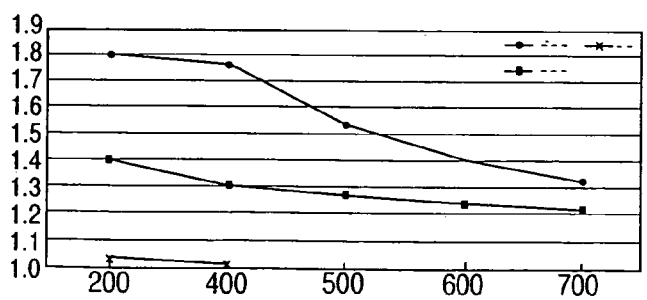
— 213

FIG. 3
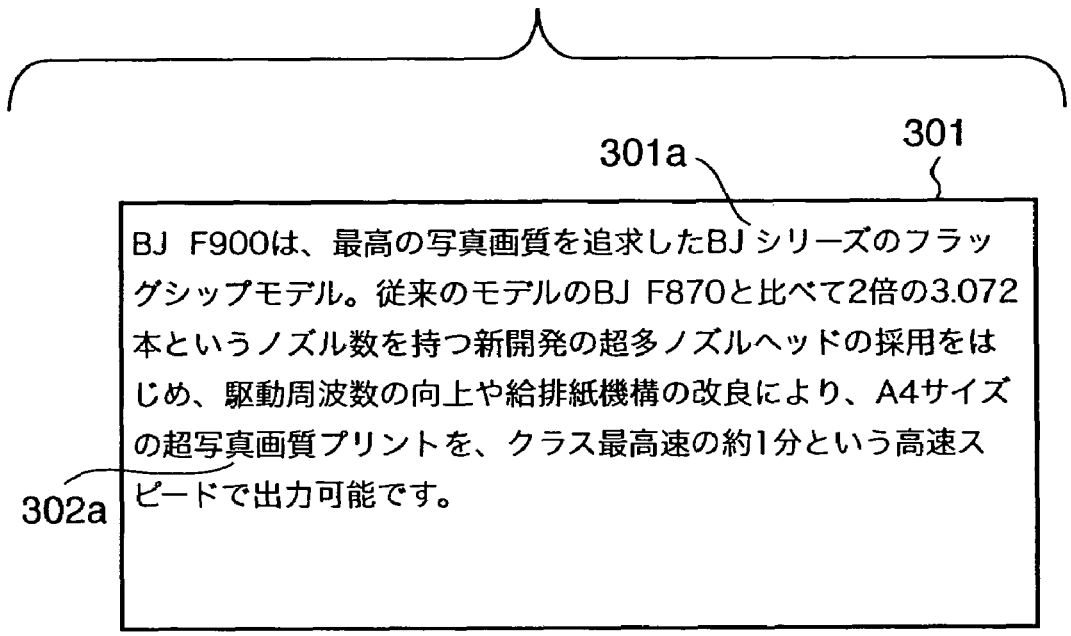
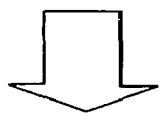

FIG. 4

| DOCUMENT ID | LAYOUT FEATURE AMOUNT |
|---|---|
| 6947 | |
| 6948 | |
| 6949 | |
| 6950 | |
| 6951 | |
| 6952 | |
| 6953 | |
| 6954 | |
| 6955 | |
| 6956 | |
| 6957 | |
| 6958 | |
| 6959 | |
| ... | |

| DOCUMENT ID | DOCUMENT VECTOR | | | | | | | | | | |
|---|---|---|---|---|---|---|---|---|---|---|---|
| | 1 | 2 | 3 | 4 | 5 | 6 | 7 | 8 | 9 | 10 | ... |
| 6947 | 1 | 28 | 0 | 1 | 0 | 0 | 0 | 9 | 0 | 0 | ... |
| 6948 | 0 | 84 | 0 | 0 | 0 | 0 | 0 | 1 | 0 | 1 | ... |
| 6949 | 0 | 39 | 0 | 0 | 1 | 1 | 0 | 7 | 0 | 1 | ... |
| 6950 | 1 | 93 | 1 | 1 | 1 | 0 | 0 | 4 | 0 | 0 | ... |
| 6951 | 0 | 28 | 1 | 0 | 0 | 0 | 1 | 6 | 0 | 1 | ... |
| 6952 | 0 | 0 | 0 | 0 | 1 | 0 | 0 | 0 | 1 | 0 | ... |
| 6953 | 0 | 4 | 1 | 1 | 0 | 0 | 1 | 2 | 0 | 0 | ... |
| 6954 | 1 | 75 | 0 | 0 | 0 | 0 | 0 | 0 | 0 | 0 | ... |
| 6955 | 0 | 0 | 1 | 0 | 1 | 0 | 0 | 5 | 0 | 0 | ... |
| 6956 | 0 | 7 | 0 | 1 | 0 | 1 | 1 | 4 | 0 | 1 | ... |
| 6957 | 0 | 15 | 0 | 0 | 0 | 0 | 0 | 3 | 0 | 0 | ... |
| 6958 | 0 | 25 | 0 | 0 | 0 | 0 | 0 | 0 | 0 | 0 | ... |
| 6959 | 0 | 41 | 0 | 0 | 0 | 0 | 0 | 10 | 0 | 0 | ... |
| ... | | | | | | | | | | | |

B, 8, 及 　　管, 菅, 官 　　5, S

DOCUMENT RETRIEVING METHOD AND APPARATUS

FIELD OF THE INVENTION

The present invention relates to a document management system, and more particularly, to a technique of retrieving from stored documents a document identical to a printed document.

BACKGROUND OF THE INVENTION

Many document generation and editing systems for generating and editing, and document management systems for storing and managing generated or edited documents have conventionally been proposed. In such document management systems, a stored document can be retrieved, and the retrieved document can be printed by a printer.

Lately, as the computers and networks develop, a large amount of electronic documents are stored in a computer system. Along with this situation, the amount of data managed in the document management systems is enlarging. In view of this situation, there are increasing demands for a retrieving technique that can retrieve a target document from a document database holding a large amount of document data.

Many retrieving techniques have been proposed, including a simple retrieving method which performs a search by designating the name of a file or a document number, a keyword search which performs a search by using a keyword given to each document in advance, a full-text search which performs a search by using an arbitrary term included in contents of the document, a concept search which performs a search based on a conceptual feature of the content of the document, and so forth. Many of these retrieving techniques perform a search by using a text inputted from a keyboard as a query.

Besides these retrieving techniques using a text query, a technique that uses a paper-printed document as a search query has been proposed. In this technique, a paper-printed document is scanned for reading the document data, and the original electronic document of the printed document is searched using the read data (using the data as a query). In this specification, such retrieving technique will be referred to as an original document search.

For instance, according to the original document search disclosed in Japanese Patent Application Laid-Open (KO-KAI) No. 8-263512, a document printed on printing paper is read by a scanner, digitalized and subjected to character recognition, then a user designates as the scope of the search a character string from the character recognition result, and a document that finds a match in the content and its positional relation is retrieved.

Although the technique disclosed in Japanese Patent Application Laid-Open (KOKAI) No. 8-263512 is proposed for retrieving an electronic document based on a paper-printed document, a problem still remains in that the user must designate a character string to be used as a query after the document is scanned and subjected to character recognition, and that the user must bear the cumbersome operation of designating a scope of the search. It is of course possible to designate the entire document as the scope of the search, but in this case, character strings of the entire document must be subjected to matching. Taking a character recognition error into consideration, this matching ends up with an ambiguous matching and imposes an enormous processing load. Therefore, realistic response performance cannot be expected.

SUMMARY OF THE INVENTION

The present invention has been proposed in view of the conventional problems, and has as its object to enable execution of the original document search without imposing a particular burden on a user while achieving realistic response performance.

In order to attain the above object, the document retrieving method according to the present invention comprises a first acquisition step of acquiring text data based on image data of a document and acquiring text feature data based on the acquired text data; a second acquisition step of acquiring image feature data based on the image data of the document; a storing step of storing in storage means the text feature data and the image feature data, respectively acquired in the first and second acquisition steps, in association with the document; and a retrieving step of retrieving a document stored in the storage means using the text feature data and the image feature data acquired by executing the first and second acquisition steps on a search document.

Furthermore, in order to attain the above object, the document retrieving apparatus according to the present invention has the following configuration. More specifically, the document retrieving apparatus comprises: a first acquisition unit configured to acquire text data based on image data of a document and acquire text feature data based on the acquired text data; a second acquisition unit configured to acquire image feature data based on the image data of the document; a storage unit configured to store the text feature data and the image feature data, respectively acquired by the first and second acquisition units, in association with the document; and a retrieving unit configured to retrieve a document stored in the storage unit using the text feature data and the image feature data acquired by executing the first and second acquisition units on a search document.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of block analysis;

FIG. 3 shows an example of OCR text extraction;

FIG. 4 shows an example of a data construction of a layout similarity search index in the document retrieving apparatus according to the embodiment;

FIG. 5 shows an example of a data construction of a text content similarity search index in the document retrieving apparatus according to the embodiment;

DETAILED DESCRIPTION OF THE PREFERRED EMBODIMENTS

Preferred embodiments of the present invention will now be described in detail in accordance with the accompanying drawings.

Figure 1:
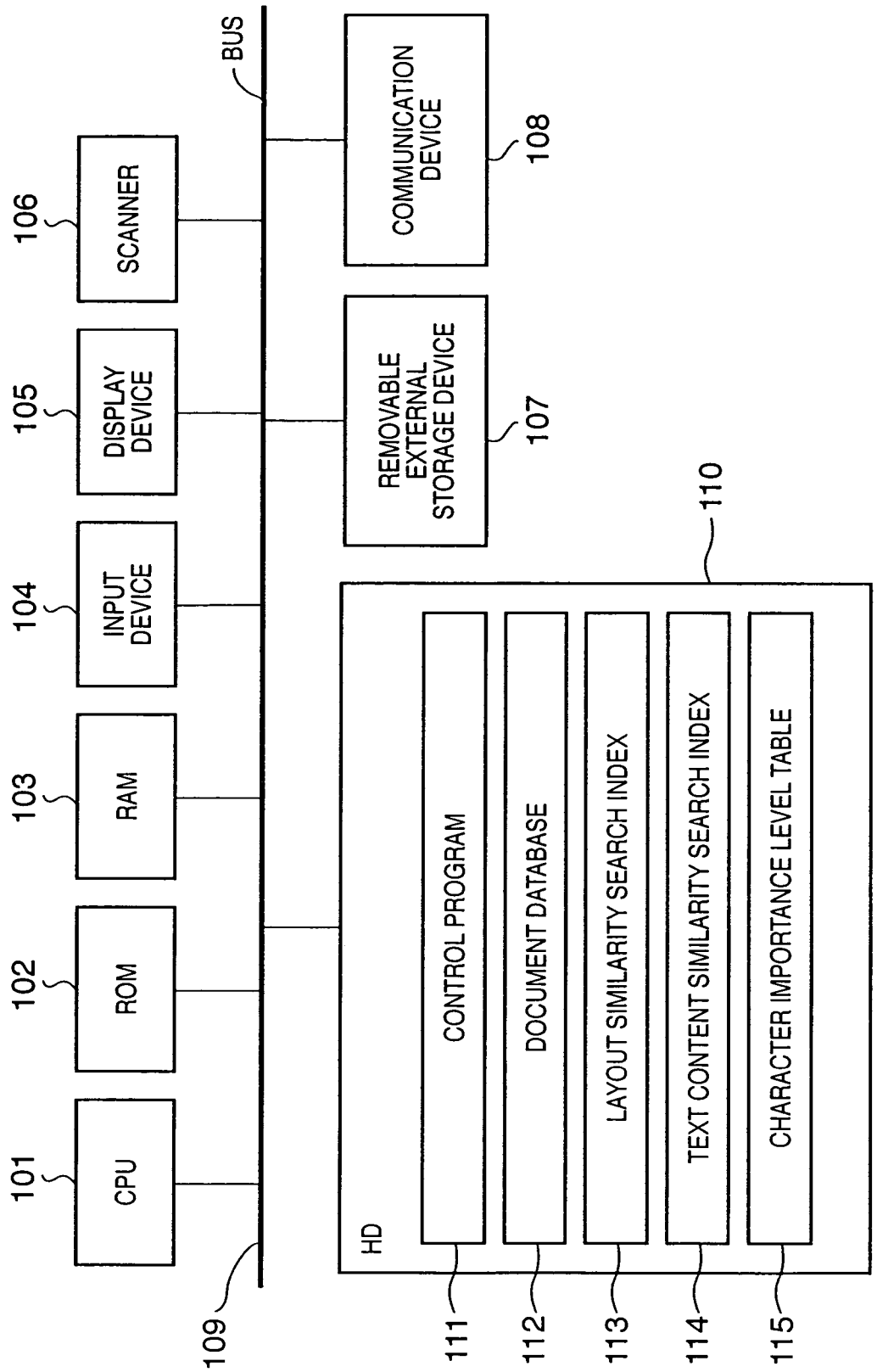
FIG. 1 is a block diagram showing an entire construction of a document retrieving apparatus according to an embodiment of the present invention.

FIG. 1 is a block diagram showing a construction of a document retrieving apparatus according to this embodiment. In the construction shown in FIG. 1, numeral 101 denotes a microprocessor (CPU) which performs calculation and logical determination for document retrieving and controls respective components connected via a bus 109. Numeral 109 denotes a bus (BUS) for transferring control signals and address signals for designating respective components subjected to control by the CPU 101. The bus 109 also performs data transfer between respective components.

Numeral 103 denotes a writable random access memory (RAM) used as a primary storage of various data transferred from respective components. Numeral 102 denotes a read-only memory (ROM) for storing a boot program or the like executed by the CPU 101. The boot program is a control program 111 stored in a hard disk 110 which is loaded to the RAM 103 at the time of system startup and executed by the CPU 101. The control program 111 will be described later in detail with reference to the flowchart.

Numeral 104 denotes an input device including a keyboard and a pointing device (mouse in this embodiment). Numeral 105 denotes a display device, such as a CRT, a liquid crystal display or the like. The display device 105 displays various data under the control of the CPU 101. Numeral 106 denotes a scanner which optically reads a paper-printed document and digitalizes the data.

Numeral 110 denotes a hard disk (HD) which stores the control program 111 executed by the CPU 101, a document database 112 storing documents subjected to retrieving, a layout similarity search index 113 used as an index at the time of performing a layout similarity search, a text content similarity search index 114 used as an index at the time of performing a text content similarity search, a character importance level table 115 storing data related to the importance level of each character used at the time of performing a text content similarity search, and the like.

Numeral 107 denotes a removable external storage device that is a drive for accessing an external storage such as a flexible disk, CD, DVD or the like. The removable external storage device 107 can be used similarly to the hard disk 110, and it is possible to exchange data with other document processing apparatuses through these recording media. It may be constructed such that the control program can be copied from the external storage device to the hard disk 110 as necessary. Numeral 108 denotes a communication device serving as a network controller in this embodiment. The communication device 108 performs data exchange with an external unit via a communication line.

In the document retrieving apparatus according to this embodiment having the above-described configuration, corresponding process is executed in response to various inputs from the input device 104. More specifically, when an input is supplied from the input device, an interruption signal is transmitted to the CPU 101. In accordance with the interruption signal, the CPU 101 reads various commands out of the ROM 102 or RAM 103 and performs various controlling by executing these commands.

FIG. 2 is an explanatory view showing an example of block analysis performed in this embodiment. A scanned image 201 is an image of a paper-printed document which is read and digitalized by the scanner 106. Block analysis is a technique of dividing the document image into rectangular blocks in accordance with the attribute. In the case shown in FIG. 2, the document image is divided into three blocks as a result of block analysis. One of the blocks is a text block 211 which includes texts, and the other two blocks are image blocks 212 and 213 which include data other than texts (a graph, photograph and so on). The text block 211 is subjected to character recognition for text extraction, but the image blocks 212 and 213 are not subjected to text extraction.

FIG. 3 explains the OCR text data extracted from the text block. A text block 301 of a scanned image (e.g., 211 in FIG. 2) is subjected to character recognition processing, and OCR text data 302 is extracted. Character recognition does not necessarily result in accurate recognition. Therefore, the OCR text data 302 includes erroneous recognition data. In the example shown in FIG. 3, the character string that should read "シリーズ" is recognized as "〇 シリーズ" (301a, 301b), and the character string that should read "超写真画質" is recognized as "超写真白質" (302a and 302b). In a text search, since matching has to be performed between such an erroneously recognized character string and a correct character string, it is difficult to perform matching by a simple matching technique. If a simple matching technique is used, the processing load increases enormously.

The document retrieving apparatus according to the present embodiment realizes an original document search with high accuracy at high speed by ingeniously integrating a search using an image feature and a search using a text feature.

FIG. 4 shows an example of a data construction of the layout similarity search index. The layout similarity search index 113 is index information for performing a similarity search based on a layout. The layout feature amount is stored in association with each document (identified by a unique document ID) registered in the document database. The layout feature amount is information for determining similarity of the layout. For instance, a bitmap image of a printed document is divided into n×m rectangles, and average brightness data and/or color data of each rectangle are stored as an image feature amount. An image feature amount for a similarity search, which is proposed in Japanese Patent Application Laid-Open (KOKAI) No. 10-260983, can be applied. Note that the position and/or size of the text block or image block, obtained by the above-described block analysis, can be employed as the layout feature amount.

The layout feature amount of an electronic document is produced based on a bitmap image of the document, which is obtained by performing pseudo-printing processing at the time of document registration. The layout feature amount of a scanned document is produced based on a scanned and digitalized image. When a layout similarity search is performed, the layout feature amount is produced from a scanned document, and a layout similarity level is calculated one at a time with respect to the layout feature amount of each document stored in the layout similarity search index 113.

FIG. 5 shows an example of a data construction of the text content similarity search index. The text content similarity search index 114 is index information for performing a similarity search based on similarity of a text content. A document vector is stored in association with each document registered in the document database. The document vector is information for determining similarity of a text content. Herein, assume that the dimension of the document vector is a character, and that a value of each dimension of the document vector is an occurrence frequency of the character. Note that one character is not exactly defined as one dimension, but a similar character group is defined as one dimension of the document vector, taking a possibility of OCR erroneous recognition into consideration. For instance, in FIG. 5, three characters "B", "8", and "及" are defined as dimension 2. The occurrence frequencies for respective characters included in the target document are stored in the index 114.

Note, in a case where a document includes a plurality of text blocks, all the OCR text data extracted from the plurality of text blocks are collectively compiled, and one document vector is produced.

When a layout similarity search is performed, vector data (query vector) having the same form as the document vector stored in the index 114 is produced from the scanned document that is used as a search query, and a text content similarity level is calculated one at a time with respect to the document vector of each document. Hereinafter, the calculation of a text content similarity level is described.

Figure 6:
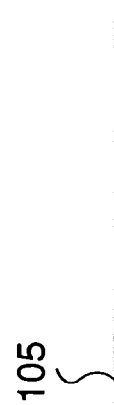
FIG. 6 is a table showing an example of a character importance level table in the document retrieving apparatus according to the embodiment.

FIG. 6 shows an example of a character importance level table. The character importance level table 115 is a table showing an importance level of each character used in determination of similarity of a text content. This table stores an occurrence frequency of each character (corresponding to each dimension in FIG. 5) in the entire document database.

An importance level $W_k$ of each character is obtained by an inverse number of the frequency stored in the character importance level table.

$$W_k = 1/(\text{occurrence frequency of character } k \text{ in the entire document database}) \quad (1)$$

Note that when the frequency is 0, the importance level is 0 because a character that does not appear in the document database is useless in determining the similarity. The reason that the importance level takes an inverse number of the frequency is in that such ordinary character that appears in many documents has a relatively low importance level when determining similarity of a text content.

Described next is a similarity calculation for determining similarity of a document according to this embodiment. Defining that a document vector is X ($X=(x_1, x_2, x_3, \ldots, x_n)$), a query vector is Q ($Q=(q_1, q_2, q_3, \ldots, q_n)$), and an importance level of character k is $W_k$, a text content similarity level TS(X, Q) is obtained by equation (2):

$$TS(X, Q) = -\sum_{k=1}^{n} ABS(x_k - q_k) \times w_k \quad (2)$$

In other words, with respect to the two documents subjected to comparison, an absolute value of the difference in the occurrence frequencies of all characters (from k=1 to k=n) is multiplied by an importance level of the target character, and the result is integrated. The text content similarity level TS(X, Q) is expressed by a minus value of the integrated value. The minus value is taken because the larger the difference in the occurrence frequency, the lower the text content similarity level. When the value of the text content similarity level is high, it is determined that there is high similarity. Similarly, with respect to the layout similarity level, when the value of the similarity level is high, it is determined that there is high similarity.

Next, a total similarity level S is obtained by basically adding the text content similarity level TS to the layout similarity level LS. However, in accordance with an importance level of the respective similarity level calculations, weights a and P are multiplied. In other words, the total similarity level S is calculated by equation (3):

$$S = \alpha \times TS + \beta \times LS \quad (3)$$

In equation (3), a is a weight for text content data and $\beta$ is a weight for layout data. The values of $\alpha$ and $\beta$ are variable. When reliability of text content data is low, the value of the text content weight a is lowered. In the case of text content data, reliability greatly differs depending on whether or not the text block of the document includes sufficient text data, or text data has been properly recognized as characters. In the case of layout data, reliability of the data itself does not greatly change since any document has a layout and the analysis does not fail largely.

For instance, in a case where the reliability of text content data is sufficiently high, $\alpha=1$ and $\beta=1$ are set. In a case where the text content is not reliable, $\alpha=0.1$ and $\beta=1$ are set.

Figure 7:
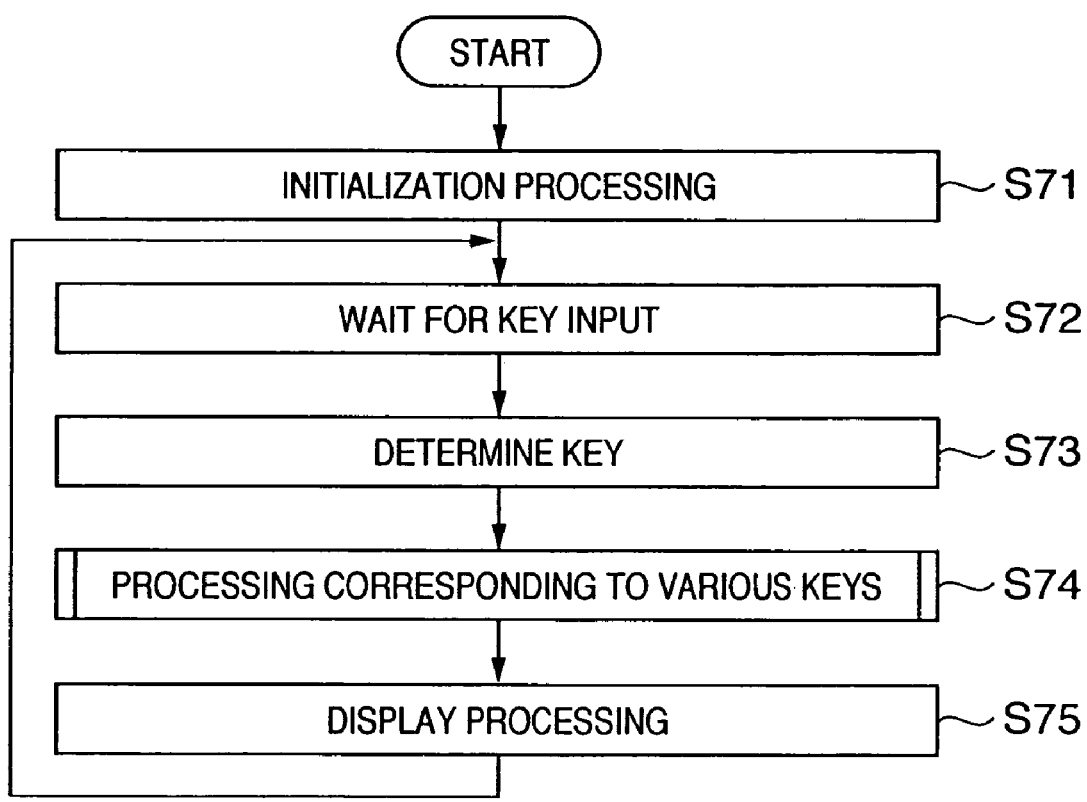
FIG. 7 is a flowchart showing an example of a processing procedure in the document retrieving apparatus according to the embodiment.

The aforementioned operation is now described with reference to flowcharts. FIG. 7 is a flowchart showing operation of the document retrieving apparatus according to the present embodiment, more specifically, a processing procedure of the CPU 101.

Figure 8:
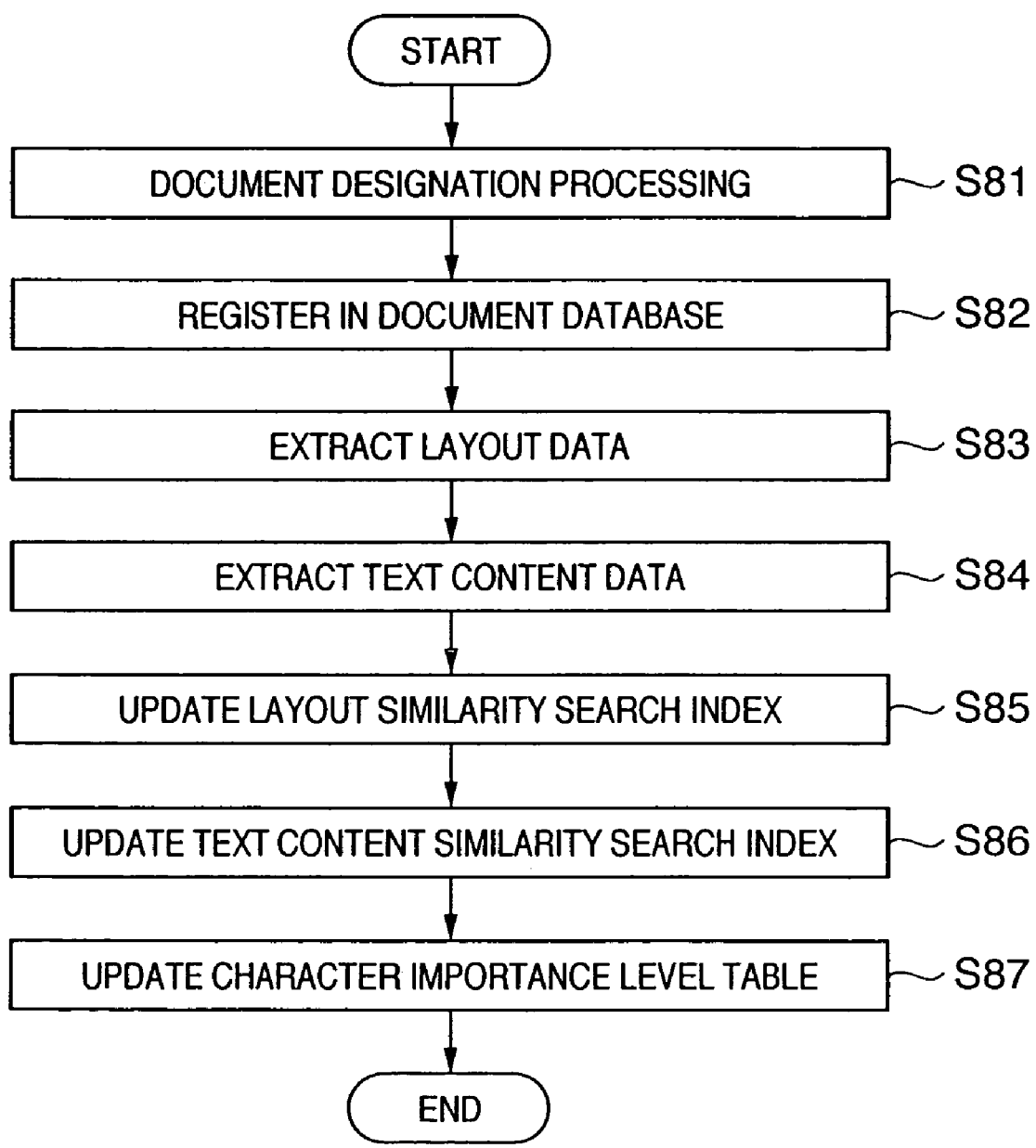
FIG. 8 is a flowchart showing an example of a processing procedure of document registration processing.
Figure 9:
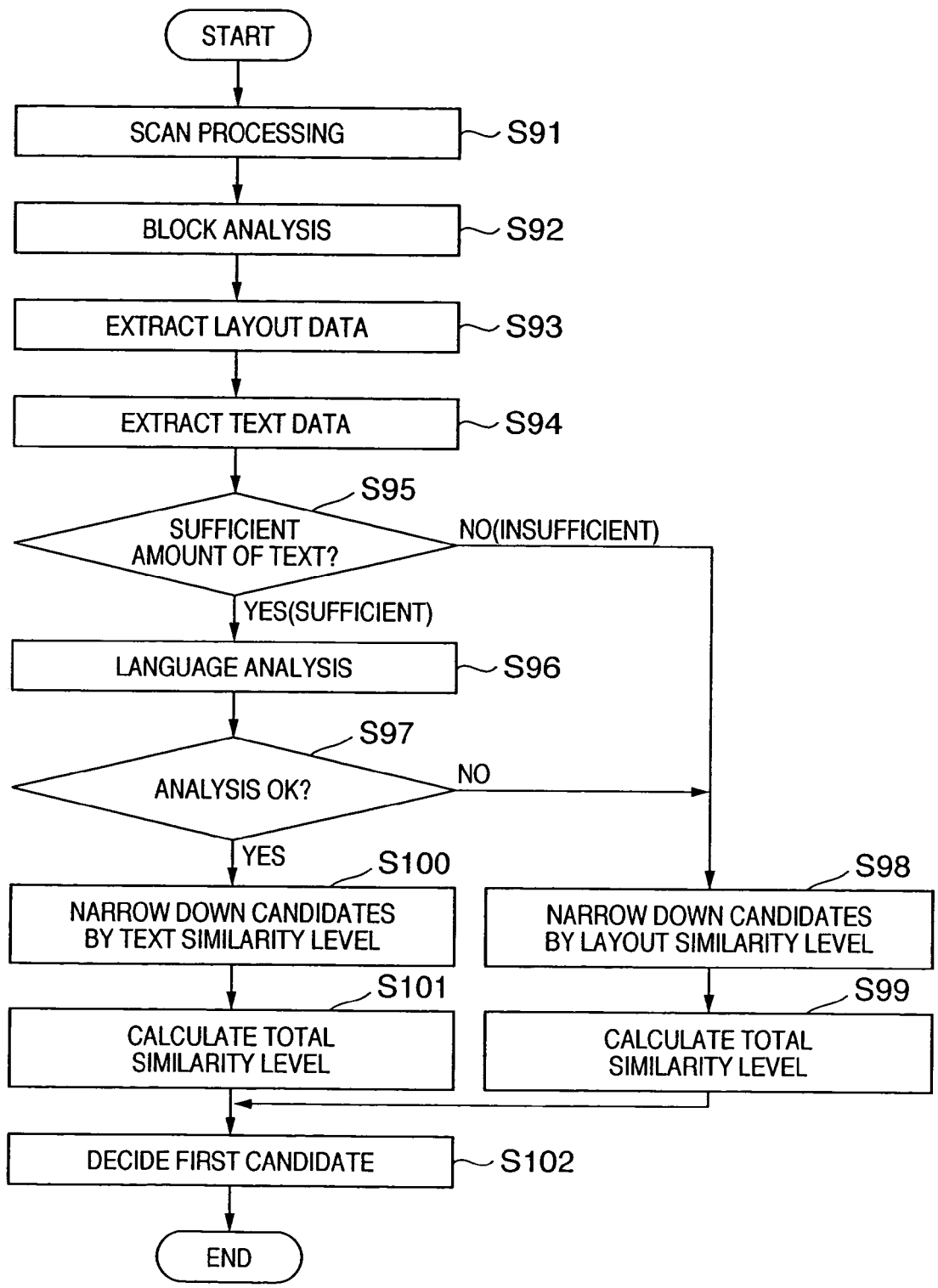
FIG. 9 is a flowchart showing an example of a processing procedure of original document retrieval execution processing.

Step S71 is a system initializing process in which initialization of various parameters, displaying of an initial screen and the like are performed. In step S72, the CPU 101 waits for an interruption caused by key depression of an input device, e.g., a keyboard. When a key is depressed, the microprocessor CPU determines the key in step S73, and branches out to various processing in accordance with the type of key. Step S74 collectively represents the plurality of processing which have been branched out in accordance with the respective keys. The document registration processing and original document search execution processing shown in FIGS. 8 and 9 are a part of the branched-out processing. Although detailed descriptions of other processing are not provided in this embodiment, other processing includes search processing performed by inputting a query character string from a keyboard, processing for document management such as version management, and the like. Step 75 is display processing for displaying a result of respective processing. It is a widely performed processing, such as developing a display pattern of a display content and outputting it to a buffer.

FIG. 8 is a flowchart showing detailed document registration processing which is a part of step S74. In step S81, a user is asked to designate a document to be registered in the document database. The user designates an electronic document that exists in a disk or a paper-printed document. In step S82, the document designated for registration is registered in the document database. When a paper-printed document is designated, the paper-printed document is read and digitalized by a scanner, and a bitmap image is generated and registered.

In step S83, layout data is extracted from the registered document. Herein, the registered document is subjected to pseudo-printing to generate a bitmap image, then feature data are extracted from the bitmap image and stored in the form of layout feature amount. In a case where a paper-printed document is read by a scanner, the bitmap image can be used for extracting layout data. For an example of the layout data extraction method, a bitmap image is divided into n×m rectangles and average brightness data and color data of each rectangle are extracted as layout data, as mentioned above.

In step S84, text data is extracted by, e.g., tracking an internal configuration of the registered document, thereby obtaining text content data. In the case of a bitmap image where text data cannot be extracted from an internal configuration, the bitmap image is subjected to character recognition to obtain OCR text data, and text data is extracted. The text data extraction method is described above with reference to FIG. 2. From the extracted text data, an occurrence frequency of characters is calculated in units of similar characters to be extracted as text content data, and a document vector is generated as described in FIG. 5. In step S85, the layout data extracted in step S83 is registered in the layout similarity search index 113 shown in FIG. 4 in association with the document ID, and the index is updated. In step S86, the text content data extracted in step S84 is registered in the text content similarity search index 114 shown in FIG. 5 in association with the document ID, and the index is updated. In step S87, based on the occurrence frequency of the characters included in the registered document, the character importance level table 115 shown in FIG. 6 is updated.

By the above-described processing, the document database 112 where documents are registered, layout similarity search index 113, text content similarity search index 114, and character importance level table 115 corresponding to the database 112 are formed.

FIG. 9 is a flowchart showing detailed original document search execution processing which is a part of step S74.

In step S91, a paper printed document (search document) serving as a query of the original document search is read by a scanner, and a bitmap image is formed. In step S92, the scanned bitmap image is subjected to block analysis as described in FIG. 2 to be separated into a text block, an image block, and so forth. In step S93, layout data (layout feature amount), e.g., the image feature data , is extracted from the bitmap image obtained in step S91. In step S94, OCR text data is extracted from the text block, which is separated in step S92, by character recognition processing. From the extracted text data, an occurrence frequency of characters is calculated in units of similar characters to be extracted as text content data, and a query vector is generated.

In step S95, it is determined whether or not the text size of the extracted OCR text data has a sufficiently large amount. Whether or not the text size is a sufficiently large amount is determined by whether or not the number of characters (number of bytes) in the text data exceeds a predetermined number of characters (e.g., 100 characters). For another example, it is determined by whether or not the size of the text block as an image exceeds a predetermined ratio (e.g., 25%) of the paper-printed document. When it is determined that the amount of text data is sufficiently large, the control proceeds to step S96; whereas if it is insufficient, the control proceeds to step S98.

When there is sufficient amount of text data, in step S96, the text data is subjected to language analysis such as morphemic analysis. In this stage, data that shows whether or not the language analysis has normally been performed, e.g., an analysis error rate, is obtained. One embodiment of the analysis error rate is a value obtained based on a ratio of unknown words appeared in the analysis (words not registered in the dictionary) to the number of entire words, or a ratio of the number of characters constituting the unknown words to the number of entire words. Note that, for the words included in the analysis dictionary, words prepared in advance as standard words may be used, or words or character strings extracted in advance from the documents registered in the document management system or the like may be used.

In step S97, it is determined whether or not the language analysis in step S96 has successfully been performed. Whether or not the analysis has successfully been performed is determined by whether or not the aforementioned analysis error rate is lower than a predetermined value.(e.g., 15%). If the analysis error rate is larger than the predetermined value, analysis failure is determined, and the control proceeds to step S98. Meanwhile, if the analysis error rate is lower than the predetermined value, analysis success is determined, and the control proceeds to step S100.

In step S100, a text content similarity level is calculated between the query vector generated in step S94 and each of the document vectors stored in the index 114 using equation (2). Then, predetermined numbers of documents having a high similarity level are extracted in order of top ranks, thereby narrowing down the candidates. In step S101, with respect to the candidates narrowed down in step S100, a layout similarity level is calculated between the layout data obtained in step S93 and layout data stored in the index 113, and further a total similarity level is calculated using equation (3). Note in this calculation, $\alpha=1$ and $\beta=1$ are set. In step S102, ranking is decided based on the total similarity level calculated in step S101 to determine the first candidate, and the first candidate is outputted.

Meanwhile, step S98 is a process performed in a case where the text block is not reliable. Herein, a layout similarity level of each document is calculated from the layout feature amount of a document serving as a search query obtained in step S93 and the layout feature amount of each document stored in the index 113. Then, predetermined numbers of documents having a high similarity level are extracted in order of top ranks, thereby narrowing down the candidates. In step S99, with respect to the narrowed candidates, a text content similarity level of each document is similarly calculated, and further a total similarity level is calculated using equation (3). Note in this calculation, $\alpha=0.1$ and $\beta=1$ are set. Then, the control branches to step S102. Then, in step S102, ranking is decided based on the total similarity level calculated in step S99 to determine the first candidate, and the first candidate is outputted.

Other Embodiment

The present invention is not limited to the above embodiment and various changes and modifications can be made within the spirit and scope of the present invention.

For instance, according to the technique of a text content similarity search in the aforementioned embodiment, statistics are taken for an occurrence frequency in units of characters, and characters having a close occurrence frequency are regarded similar. However in this technique, relative positional relations between characters are totally ignored. Therefore, it is possible to implement a text content similarity search that takes the relative positional relations between characters into consideration. For instance, not only an occurrence frequency of each character is counted and indexed, but also an occurrence frequency of a combination of two arbitrary characters is counted and indexed. A difference in the occurrence frequency of the combination of two characters is taken into consideration at the time of similarity level calculation. By virtue of this technique, not only a document that finds a match in the occurrence frequency of each character, but also a document that finds a match in the arrangement of characters is regarded to have a high similarity level. Therefore, a highly precise text content similarity search can be performed. As a result, a highly precise original document search can be realized.

Furthermore, in the above-described embodiment, morphemic analysis is employed as a technique of language analysis (step S96) for measuring reliability of text data. Since the purpose for employing the morphemic analysis is to determine the level of reliability in the character recognition result, a more simple method may be adopted. For instance, statistical data of standard Japanese is prepared in advance in units of character, and similar statistical data is generated with respect to a scanned document. If the data is far outside the standard Japanese text, the document is regarded as abnormal text data, and the reliability of the character recognition is determined to be low. By virtue of this technique, it is possible to avoid language analysis processing which imposes a high load on a computer, and statistical processing imposing a less load on a computer can be used instead. Therefore, even in a poor computer environment, it is possible to evaluate reliability of character recognition, and an original document search can be realized at less cost.

Furthermore, in the above-described embodiment, whether or not the amount and quality of text data in a paper-printed document is sufficient is determined (steps S95 to S97), and when they are sufficient the candidates are narrowed down based on a similarity level of the text data. In other words, the search method is changed based on text data. However, how the candidates are narrowed down can be decided based on determination of the amount and quality of layout data. In this case, the amount and quality of layout data is first determined. If the amount and quality of the layout data is sufficient, candidates are narrowed down based on a similarity level of the layout data, whereas if the amount and quality are not sufficient, candidates are narrowed down based on a similarity level of the text data. In this configuration, since it is no longer necessary to determine the amount and quality of text data, language dependence can be eliminated, thus facilitating the configuration. Therefore, an original document search can be realized at less cost.

With respect to determination of the amount and quality of layout data, for instance, the amount of layout data can be determined by the size of an image block area. In this case, if the ratio of the image block area is high, the amount of layout data is considered large. With respect to the quality of layout data, for instance, the determination is made based on the quality of image in the image block. If the ratio of multi-valued image in the image block is high, the quality of layout data is considered high, while if the ratio of binary image is high, the quality of layout data is considered low.

As is apparent from the above descriptions, according to the embodiment of the present invention, an original document search which is performed by scanning a paper-printed document, extracting a document image, and retrieving an original electronic document, can be realized without requiring a user to designate a search query. Therefore, it is possible to provide a user-friendly original document search. Furthermore, since layout data and text content data are both extracted and a search is performed taking the similarity of both data into consideration, it is possible to realize highly precise retrieving means.

In a case where reliability of text content data of a scanned document is high, a search is performed by narrowing down the candidates using a similarity search that is based upon the text content data. Therefore, it is possible to realize high-speed original document search means, while maintaining high precision.

On the contrary, in a case where reliability of text content data of a scanned document is low, a search is performed by narrowing down the candidates using a similarity search that is based upon layout data. Therefore, even for a document including few texts or for a document where character recognition is difficult, it is possible to realize a highly precise original document search.

Further, the object of the present invention can also be achieved by providing a storage medium storing software program codes for realizing functions of the above-described embodiment to a computer system or apparatus, reading the program codes, by a computer (CPU or MPU) of the computer system or apparatus, from the storage medium, then executing the program.

In this case, the program codes read from the storage medium realize the functions of the above-described embodiment, and the storage medium storing the program codes constitutes the invention.

Further, the storage medium, such as a flexible disk, hard disk, an optical disk, a magneto-optical disk, CD-ROM, CD-R, a magnetic tape, a non-volatile memory card, and ROM can be used for providing the program codes.

Furthermore, besides aforesaid functions according to the above embodiment are realized by executing the program codes which are read by a computer, the present invention includes a case where an OS(operating system) or the like working on the computer performs a part or the entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire processes in accordance with designations of the program codes and realizes functions of the above embodiment.

As has been set forth above, according to the present invention, it is possible to execute an original document search of an electronic document without imposing a particular burden on a user while achieving realistic response performance.

As many apparently widely different embodiments of the present invention can be made without departing from the spirit and scope thereof, it is to be understood that the invention is not limited to the specific embodiments thereof except as defined in the claims.

What is claimed is:

1. A document retrieving method for retrieving a document from a storage by using an information processing apparatus comprising:
   a first acquisition step of acquiring text data by executing character-recognition processing for image data of a document and acquiring text feature data based on the text data acquired as a result of the character-recognition processing;

a second acquisition step of acquiring layout feature data based on the image data of the document;

a storing step of storing, in storage means, text feature data and layout feature data respectively acquired from a registered document in said first and second acquisition steps, in association with the registered document;

a determining step of determining, for a search document from which text feature data and layout feature data have been acquired in said first and second acquisition steps, whether the text feature data acquired from the search document or the layout feature data acquired from the search document is used for a narrowing-down process, based on the text feature data acquired from the search document in said first acquisition step;

a first narrow-down step of narrowing down a plurality of registered documents stored in the storage means based on the text feature data acquired from the search document in said first acquisition step if said determining step determined that the text feature data acquired from the search document is used;

a second narrow-down step of narrowing down the plurality of registered documents stored in the storage means based on the layout feature data acquired from the search document in said second acquisition step if said determining step determined that the layout feature data acquired from the search document is used; and a retrieving step of retrieving a document, based on both the text feature data and the layout feature data acquired from the search document in said first and second acquisition steps, from the registered documents narrowed-down in said first narrow-down step or said second narrow-down step.

2. The method according to claim 1, wherein in said retrieving step, a similarity level between the search document and each document of the plurality of registered documents is obtained based on both a similarity of the text feature data and a similarity of the layout feature data, and the retrieved document is determined based on the obtained similarity levels.

3. The method according to claim 2, wherein in said retrieving step, the similarity level is obtained by adding weights to the similarity of the text feature data and the similarity of the layout feature data.

4. The method according to claim 1, wherein in said determining step, whether the text feature data or the layout feature data acquired from the search document is used for the narrowing-down process is determined based on analysis of the text feature data of the search document.

5. The method according to claim 4, wherein in said determining step, whether the text feature data or the layout feature data is used for the narrowing-down process is determined based on an amount of the text data acquired as the result of the character-recognition processing for the search document and a precision evaluation of the result of character recognition processing for the search document.

6. The method according to claim 1, wherein the layout feature data is acquired based on average brightness data and/or color data of n×m rectangles into which the image data of the document is divided.

7. The method according to claim 1, wherein the layout feature data is acquired based on position and/or size of blocks which are obtained by block analysis of the image data of the document.

8. A storage medium storing a control program which causes a computer to execute the document retrieving method described in claim 1.

9. A computer-executable control program stored on a computer-readable medium which causes a computer to execute the document retrieving method according to claim 1.

10. A document retrieving apparatus for retrieving a document from a storage comprising:

a first acquisition unit configured to acquire text data by executing character-recognition processing for image data of a document and to acquire text feature data based on the text data acquired as a result of the character-recognition processing;

a second acquisition unit configured to acquire layout feature data based on the image data of the document;

a storage unit configured to store the text feature data and the layout feature data respectively acquired from a registered document by said first and second acquisition units, in association with the registered document;

a determining unit for determining, for a search document from which text feature data and layout feature data have been acquired by said first and second acquisition units, whether the text feature data acquired from the search document or the layout feature data acquired from the search document is used for a narrowing-down process, based on the text feature data acquired from the search document by said first acquisition unit;

a first narrow-down unit for narrowing down a plurality of registered documents stored in the storage means based on the text feature data acquired from the search document by said first acquisition unit if said determining unit determined that the text feature data acquired from the search document is used;

a second narrow-down unit for narrowing down the plurality of registered documents stored in the storage means based on the layout feature data acquired from the search document by said second acquisition unit if said determining unit determined that the layout feature data acquired from the search document is used; and a retrieving unit configured to retrieve a document, based on both the text feature data and the layout feature data acquired from the search document by said first and second acquisition units, from the registered documents narrowed-down by said first narrow-down unit or said second narrow-down unit.

11. The apparatus according to claim 10, wherein said retrieving unit obtains a similarity level between the search document and each document of the plurality of registered documents based on both a similarity of the text feature data and a similarity of the layout feature data, and determines the retrieved document based on the obtained similarity levels.

12. The apparatus according to claim 11, wherein said retrieving unit obtains the similarity level by adding weights to the similarity of the text feature data and the similarity of the layout feature data.

13. The apparatus according to claim 10, wherein said determining unit determines whether the text feature data or the layout feature data is used for the narrowing-down process based on analysis of the text feature data of the search document.

14. The apparatus according to claim 13, wherein said determining unit determines whether the text feature data or the layout feature data acquired from the search document is used for the narrowing-down process based on an amount of the text data acquired as the result of the character-recognition processing for the search document and a precision evaluation of the result of character recognition processing for the search document.

15. The apparatus according to claim 10, wherein the layout feature data is acquired based on average brightness data and/or color data of n×m rectangles into which the image data of the document is divided.

16. The apparatus according to claim 10, wherein the layout feature data is acquired based on position and/or size of blocks which are obtained by block analysis of the image data of the document.

17. A document retrieving method for retrieving a document from a storage by using an information processing apparatus comprising:
   a first acquisition step of acquiring text data by executing character-recognition processing for image data of a search document and acquiring text feature data based on the text data acquired as a result of the character-recognition processing;
   a second acquisition step of acquiring layout feature data based on the image data of the search document;
   a determining step of determining, based on the text feature data acquired from the search document in said first acquisition step, whether the text feature data or the layout feature data is used for a narrowing-down process;
   a first narrow-down step of narrowing down a plurality of registered documents stored in a storage means based on the text feature data acquired in said first acquisition step if said determining step determined that the text feature data is used for the narrowing-down process;
   a second narrow-down step of narrowing down the plurality of registered documents stored in the storage means based on the layout feature data acquired in said second acquisition step if said determining step determined that the layout feature data is used for the narrowing-down process; and
   a retrieving step of retrieving a document, based on both the text feature data and the layout feature data acquired in said first and second acquisition steps, from the registered documents narrowed-down in said first narrow-down step or said second narrow-down step.

18. A document retrieving method for retrieving a document from a storage by using an information processing apparatus comprising:
   a first acquisition step of acquiring text data by executing character-recognition processing for image data of a search document and acquiring text feature data based on the text data acquired as a result of the character-recognition processing;
   a second acquisition step of acquiring layout feature data based on the image data of the search document;
   a determining step of determining, based on the layout feature data acquired from the search document in said second acquisition step, whether the text feature data or the layout feature data is used for a narrowing-down process;
   a first narrow-down step of narrowing down a plurality of registered documents stored in a storage means based on the text feature data acquired in said first acquisition step if said determining step determined that the text feature data is used for the narrowing-down process;
   a second narrow-down step of narrowing down the plurality of registered documents stored in the storage means based on the layout feature data acquired in said second acquisition step if said determining step determined that the layout feature data is used for the narrowing-down process; and
   a retrieving step of retrieving a document, based on both the text feature data and the layout feature data acquired in said first and second acquisition steps, from the registered documents narrowed-down in said first narrow-down step or said second narrow-down step.

19. A document retrieving apparatus for retrieving a document from a storage comprising:
   a first acquisition unit for acquiring text data by executing character-recognition processing for image data of a search document and acquiring text feature data based on the text data acquired as a result of the character-recognition processing;
   a second acquisition unit for acquiring layout feature data based on the image data of the search document;
   a determining unit for determining, based on the text feature data acquired from the search document by said second acquisition unit, whether the text feature data or the layout feature data is used for a narrowing-down process;
   a first narrow-down unit for narrowing down a plurality of registered documents stored in a storage means based on the text feature data acquired by said first acquisition unit if said determining unit determined that the text feature data is used for the narrowing-down process;
   a second narrow-down unit for narrowing down the plurality of registered documents stored in the storage means based on the layout feature data acquired by said second acquisition unit if said determining unit determined that the layout feature data is used for the narrowing-down process; and
   a retrieving unit for retrieving a document, based on both the text feature data and the layout feature data acquired by said first and second acquisition units, from the registered documents narrowed-down by said first narrow-down unit or said second narrow-down unit.

20. A document retrieving apparatus for retrieving a document from a storage comprising:
   a first acquisition unit for acquiring text data by executing character-recognition processing for image data of a search document and acquiring text feature data based on the text data acquired as a result of the character-recognition processing;
   a second acquisition unit for acquiring layout feature data based on the image data of the search document;
   a determining unit for determining, based on the layout feature data acquired from the search document by said second acquisition unit, whether the text feature data or the layout feature data is used for a narrowing-down process;
   a first narrow-down unit for narrowing down a plurality of registered documents stored in a storage means based on the text feature data acquired by said first acquisition unit if said determining unit determined that the text feature data is used for the narrowing-down process;
   a second narrow-down unit for narrowing down the plurality of registered documents stored in the storage means based on the layout feature data acquired by said second acquisition unit if said determining unit determined that the layout feature data is used for the narrowing-down process; and
   a retrieving unit for retrieving a document, based on both the text feature data and the layout feature data acquired by said first and second acquisition units, from the registered documents narrowed-down by said first narrow-down unit or said second narrow-down unit.

* * * * *